Figure 1:
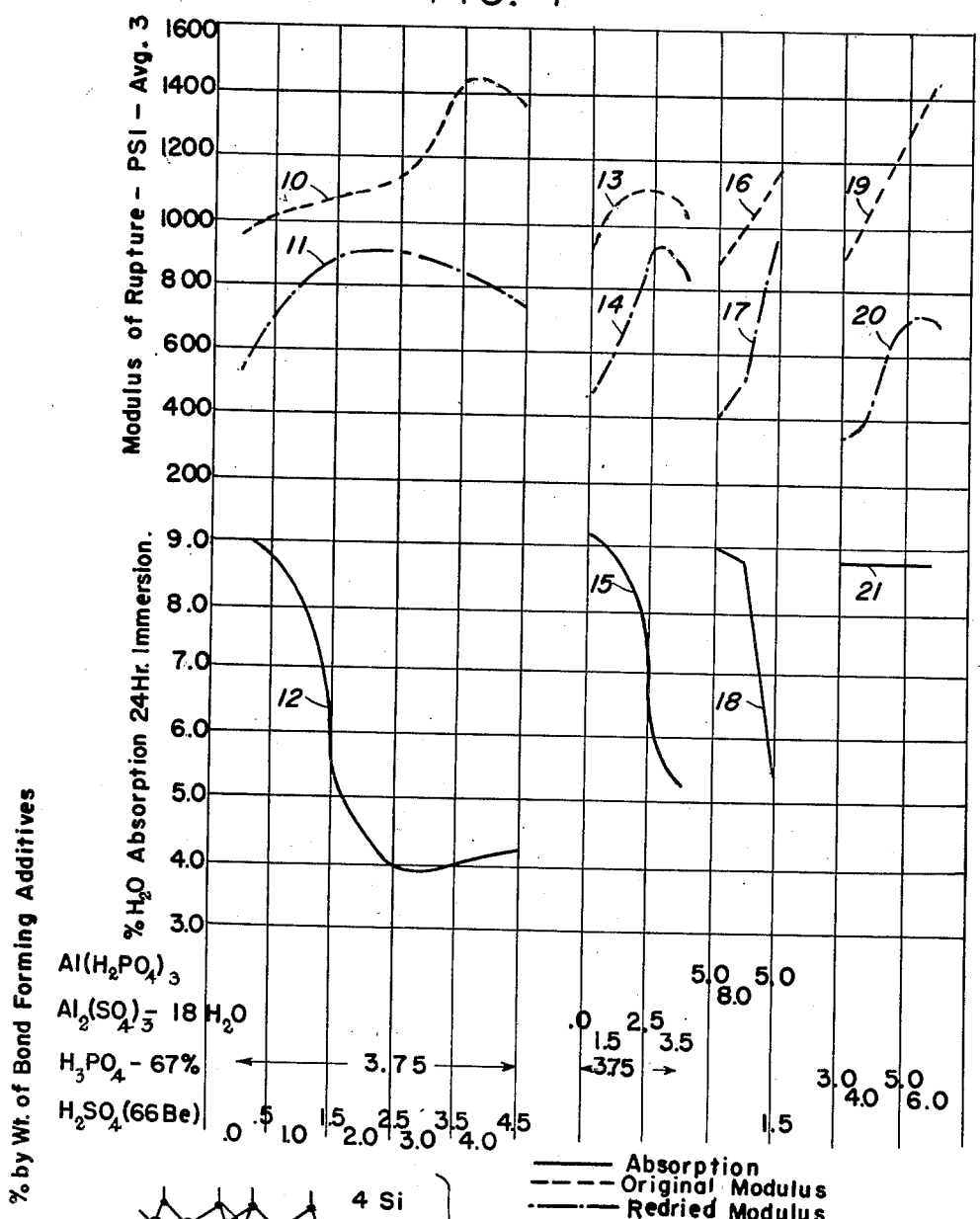

Nov. 24, 1953  H. F. WEST ET AL  2,660,536
UNFIRED REFRACTORIES AND THEIR PREPARATION
Filed May 21, 1951

INVENTORS:
HOWARD F. WEST, &
JOHN H. VEALE,

ATTORNEY

Patented Nov. 24, 1953

2,660,536

UNITED STATES PATENT OFFICE 2,660,536

UNFIRED REFRACTORIES AND THEIR PREPARATION

Howard F. West, Joliet, and John H. Veale, Coal City, Ill., assignors to Illinois Clay Products Company, Joliet, Ill., a corporation of Illinois Application May 21, 1951, Serial No. 227,348

7 Claims. (Cl. 106—67)

This invention relates to improvements in unfired refractories and the like.

An unfired refractory is one wherein the constituents or aggregates are bonded together without firing, e. g., without the development of a ceramic bond.

The said aggregates comprise certain clays including high alumina clays with or without other aggregates, such as carbon, silica and other inert substances. The bond-forming substances which tie the aggregates together are sulphuric and phosphoric acids or one of the acids and the aluminum salt of the other acid, functioning as presently described. If, during use of the aforesaid refractories sufficiently high temperatures are encountered, a ceramic bond may also be formed by partial fusion or sintering of the clay minerals.

The further nature and details of the invention will appear from the following description of illustrative products and the methods of their manufacture.

Figure 2:
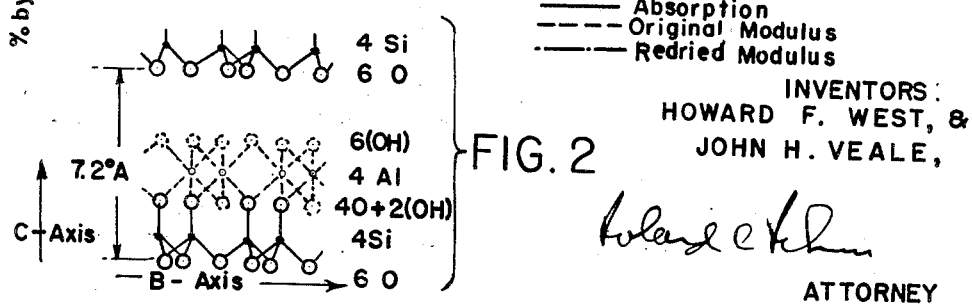

In the drawing:

Fig. 1 is a chart illustrating certain properties of the illustrative products; and Fig. 2 is a diagram of the structure of the clay mineral kaolinite.

Heretofore it has been considered practically impossible to react clay and practicable amounts of phosphoric acid to develop a bond. We have discovered, on the contrary, that such reaction can be effected (using practicable amounts of said acid) with certain classes of mineral clay, as presently explained.

Clay mineral crystals have a so-called lattice or sheet structure. In general, two units are involved in these structures. One is the alumina or aluminum hydroxide layer or unit which consists of closely packed oxygens or hydroxyls between which aluminum atoms are embedded. This is the gibbsite structure, gibbsite being a uni-layer mineral. The second layer or unit consists of a sheet of tetrahedral silica groups. This unit may be considered as a sheet of loosely packed oxygen atoms with each oxygen linked to silicon atoms directly adjacent (see Fig. 2). The arrangement or relative positions of these layers determines the general type of the clay mineral. For example a kaolinite sheet $((OH)_8)Al_4Si_4O_{10})$ comprises one gibbsite layer with a single layer of tetrahedral silica groups (see Fig. 2). In the direction of the $b$-axis these units may be repeated indefinitely, and in the direction of the $c$-axis the structure is in the nature of a plurality of the aforesaid sheets as indicated in Fig. 2.

Kaolinite, as well as montmorillonite and illite, has pronounced basal cleavage, which takes place with relative ease between the sheets comprising them, inasmuch as the forces binding the sheets together in the direction of the $c$-axis are relatively weak. Fragments of these minerals are therefore flake-shaped, and clays may be looked upon as aggregates of flake-shaped particles.

We have discovered that phosphoric acid will react with the gibbsite layer to form a bonding substance, probably aluminum ortho-phosphate, but a satisfactory bond can be formed only if a sufficient amount of the face of the gibbsite layer be exposed. In high quality kaolinite, the gibbsite layers are in effect exposed only at the edge of the layer, analogously to the edges of certain overlying and registering pages in a book, but this amount of exposure is wholly insufficient to develop adequate linkage with the phosphate radical to bond the separate kaolinite particles together. However, the acid is incapable, apparently, of reaching and reacting with the gibbsite layers (except insignificantly at their edges) if the faces of the layers be joined to and covered by a silica or similar layer, as in the case of montmorillonite or illite and analogous clay minerals, as presently explained. Where, however, the kaolinite sheets are imperfect, so that successive sheets do not completely register with adjacent sheets or as where partial cleavage has taken place to expose the surface of a gibbsite layer, such exposure is sufficiently extensive to permit adequate reaction of the acids with the alumina. Such exposure is analogous to the exposure of the surfaces of the cards in a deck of cards if such cards were gathered in a random pile or moved laterally relative to each other, so as not to lie completely in register with each other.

As stated above, cleavage takes place relatively easily parallel to the $b$-axis between the face of the gibbsite unit and the adjacent silica unit in kaolinite. Cleavage takes place elsewhere in montmorillonite, illite and analogous clay minerals, as presently explained.

While the suitability of a clay mineral for adequate reaction with phosphoric acid may be easily determined by testing the strength of samples thus bonded, such suitability may also be determined by X-ray diffraction analysis of the clay minerals. For example, the characteristic X-ray diffraction lines of relatively perfect (and therefore unsuitable) crystals of kaolinite are sharp and clear, whereas those of imperfect (and therefore suitable) kaolinite crystals become less and less clear the greater the degree of exposure of the faces of the gibbsite layers. In general, any clay mineral whose X-ray diffraction lines representing kaolinite or the gibbsite layer, have a faintness comparable with a clay known to give adequate strength, will produce adequate strengths in the bonded product. A suitable clay would be one which has a modulus of rupture of about 900 pounds per square inch for a dry pressed brick.

Apparently the belief in the art that phosphoric acid (in practicable amounts) would not react with clay minerals arose from the circumstance that the clay minerals used were either a kaolinite wherein the crystals were generally perfect (i. e., presented insufficient areas of the gibbsite sheet to support an adequate reaction) or other clay minerals wherein the sheet did not have a gibbsite unit on an exposed face or cleavage of the sheet. Montmorillonite and illite are examples of the latter clay crystals. In sheets of the latter, the gibbsite layer lies between silica layers and is not exposed at the cleavage plane, and therefore even with imperfect crystals, the surface of the gibbsite unit is not exposed. In montmorillonite, the crystal consists of one gibbsite unit between tetrahedral silica groups where it cannot be exposed. The illite structure is similar to that of montmorillonite.

The foregoing applies to variants of the above general types of clay minerals. The readiness with which basal cleavage takes place to expose alumina (if any) in the basal plane, also has a bearing on the extent to which the mineral particles can be linked or bonded together with phosphoric acid. Clays containing a minimum of substitutions of the alumina by iron, magnesium, potassium, and sodium are preferred since the reaction products of the latter metals with phosphoric acid are not desired.

Preferably ortho phosphoric acid is employed.

Illustrations of the lattice or sheet structure of the foregoing clay minerals may be found in a number of publications, such as Circular No. 45 published by the Illinois State Geological Survey, entitled Relation of the Composition to the Properties of Clay, by Ralph E. Grim; and Report of Investigations No. 80, published by the Illinois State Geological Survey, entitled Modern Concepts of Clay Materials, by Ralph E. Grim.

Other minerals which have a gibbsite unit or similar alumina layer on the basal plane of the sheet react similarly with phosphoric acid. Among these are the high alumina clays such as gibbsite, diaspore and bauxite. These minerals are so highly refractory that in normal use a ceramic bond would not be formed without the presence of fluxing impurities or less refractory clay.

The aluminum phosphate linkage or bond formed as aforesaid, while itself being water-resistant, is not impervious to moisture, and therefore does not exclude water from the aggregates linked by it, leaving the clay particles to the action of moisture, with the result that the strength of the bonded refractory is greatly reduced after exposure to moisture.

We have discovered that the clay particles may be protected against the weakening action of moisture by aluminum sulphate formed either by reaction of sulphuric acid with the alumina of the clay mineral, or by the direct addition of aluminum sulphate in the presence of acid, as presently explained. However, aluminum sulphate is more costly than sulphuric acid, more difficult to distribute in the minor amounts used, over the clay, and more difficult to concentrate its water-proofing function on the clay particles. Therefore, sulphuric acid is preferred to aluminum sulphate.

We have found that acidic conditions are necessary to make the aluminum sulphate effective, and for that reason the waterproofing and supplementary bonding agent which is formed must be acid aluminum sulphate. The pH should not exceed about 3. Where sulphuric acid is used in the amount and concentration herein specified, sufficiently acid conditions exist to form acid aluminum sulphate. Where aluminum sulphate is used in place of sulphuric acid, the phosphoric acid creates the necessary acidic condition.

The aluminum sulphate resulting from the reaction of acid with the clay not only efficiently protects the clay aggregates from the action of water by forming on the surfaces of the clay particles, but acts as a supplemental bond to bond both the clay aggregates and any added inert aggregates. The aluminum phosphate is the primary moisture-resistant bond (though it is pervious to moisture) and the aluminum sulphate is impervious (to protect the clay against the action of moisture) and is a secondary bond.

We have found that an acid or soluble aluminum phosphate may be used in place of phosphoric acid to bond together the clay aggregates with or without other aggregates, provided it may be used with sulphuric acid, and in the acid medium created by such acid. The sulphuric acid also functions as aforesaid to react with the clay to form the supplemental bond and the waterproofing agent to protect the clay particles from slaking and disintegration by moisture which would otherwise reach them through the moisture-pervious phosphate bond. Heretofore, mono and di-aluminum phosphates have been used as cementing substances without, however, reacting with the aggregates, but the bond has been of relatively lower strength, and pervious to moisture. For refractories such as herein disclosed, it is preferable to employ phosphoric acid, because higher strengths can be obtained at lower costs.

The accompanying drawing (Fig. 1) illustrates the effect of varying amounts of acid in controlling the strength, moisture resistance, and reduction of strength on exposure to moisture of an illustrative dry pressed brick containing the following aggregates:

| | Per cent |
|---|---|
| Refractory fire clay (comprising imperfect kaolinite) | 65 |
| Sand (silica) | 10 |
| Carbon (calcined petroleum coke) | 25 |

The sand, coke, and other inert aggregates, may be considerably varied or omitted without substantially affecting the aforesaid moisture resistance, strength, etc. of the resulting product. Within limits, such aggregates are employed for other purposes not related to the bonded strength of the product.

In the chart, curves 10, 11 and 12 illustrate the effect of varying the amounts of sulphuric acid on the modulus of rupture and the moisture absorption of the product. In the chart the abscissa represent the variation in the percent by weight of sulphuric acid, a constant amount (3.75%) of phosphoric acid (of 67% concentration) being used. Curve 10 shows the increase in modulus of rupture with increase in the amount of sulphuric acid (concentrated commercial—66° Bé.). As shown in that curve, there is a rather abrupt increase in strength between 2½% and 3½% sulphuric acid. On the other hand, as shown in curve 11 (which represents the strength of the product after the same has been exposed to moisture and subsequently dried) the modulus of rupture decreases with increase in sulphuric acid in excess of about 2%. The curves 10 and 11 suggest a compromise in the amount of sulphuric acid at about 1½% to 2½%.

Curve 12 shows the resistance of the product to absorption of moisture under varying amounts of sulphuric acid. In this illustration the amount of moisture is given as that absorbed by immersion of the product in water for twenty-four hours. The curve shows that there is an abrupt and substantially uniform increase in moisture resistance until the amount of sulphuric acid reaches about 2½%. Thereafter apparently further additions of sulphuric acid do not improve the moisture resistance.

Curves 13, 14 and 15 are curves giving the same data as curves 10, 11 and 12 respectively, for a product in which varying amounts of aluminum sulphate are substituted for sulphuric acid, the amount of phosphoric acid being constant at 3.75%. These curves show that the results achieved by varying the amount of aluminum sulphate are similar to those achieved with varying amounts of sulphuric acid.

Curves 16, 17 and 18 show the improvement in strength and water resistance effected by the addition of sulphuric acid (in this case, 1½%). Even as much as 8% of aluminum phosphate without sulphuric acid, did not result in as favorable strength and water resistance as a less amount of aluminum phosphate with a relatively small amount of sulphuric acid.

Correspondingly poor water resistance characterizes a product bonded with the use of varying amounts of phosphoric acid alone, see curves 19, 20 and 21. The significant difference is the high water absorption of the material, as shown by curve 21, and the relatively low modulus of rupture resulting after the material has been exposed to moisture and then dried, as shown by curve 20. The maximum modulus of rupture in such cases is below practical requirements. While increase in phosphoric acid improves the strength (with a prohibitive increase in cost) the increase in bonding agent (though water resistant itself) nevertheless does not increase the resistance of the product to penetration by moisture.

When the aggregates contain inert constituents (such as grog, sand and carbon) the sequence of adding the bond-forming constituents is not important provided such constituents are first added to and mixed with the inert and non-plastic materials. This facilitates distribution and avoids "balling up" of the clay, which would result if the clay were present on the initial mixing. However, if the aggregate comprise straight clay, it is preferable to add the sulphuric acid or aluminum sulphate to and mix the same with the clay first, and then to add and mix the phosphoric acid. Higher strengths are obtained if the foregoing sequence of addition and mixing be observed.

The amount of acids employed may be varied from 2½% to 7% of phosphoric acid (based on 100% strength), and 1 to 4% sulphuric acid (based on 100% strength). When aluminum sulphate is used in place of sulphuric acid, the amount employed may vary from 1% to 5%; and when aluminum phosphate is used in place of phosphoric acid, the amount may vary from 3% to 10%.

Ortho phosphoric acid is commercially available in three concentrations, namely, 67%, 75% and 85%. In the examples in the foregoing chart, 67% acid was used. Commercial sulphuric acid (i. e., 66° Bé., or 93 to 100% strength) is used. 3.75% of phosphoric acid of 67% strength gives satisfactory results. Unless greater strengths are necessary, the amount of phosphoric acid is minimized to reduce costs. A modulus of rupture after exposure to moisture and subsequent drying of 900 pounds per square inch is adequate for practical purposes in a pressed brick refractory. Such strength provides an adequate factor of safety.

As suggested by the foregoing chart, the refactory has its best water resistance with about 2% sulphuric acid (66° Bé.) but its maximum strength at about 4% sulphuric acid, with, however, some small sacrifice in water resistance.

The amount of acids used is preferably based on the total of the dry aggregates since even though the inert aggregates do not react with the acids, they hold some of the acid and make it unavailable to reaction. Furthermore, with a high proportion of inert aggregate, proper working consistency and adequate and proper distribution of the acid over the clay minerals, could not be attained if only the theoretical amount of acid (based on the clay mineral content alone) were used. Addition of water to secure proper working consistency would objectionably reduce the concentration of the acid and would further increase the drying costs.

The following are other illustrative examples of the proportions of bond forming constituents and aggregates:

*Example A*

| | |
|---|---|
| Fire clay (about 10 mesh) | 20 to 90 percent by weight. |
| Grog | 80 to 10 percent by weight. |
| $H_3PO_4$ (67% concentration) | 3.75 to 5 percent by weight, added. |
| $H_2SO_4$ | 1.5 percent by weight, added. |

*Example B*

| | |
|---|---|
| Fire clay | 65 percent by weight. |
| Calcine petroleum coke | 25 percent by weight. |
| Silica (sand) | 10 percent by weight. |
| $H_3PO_4$ (67%) | 3.75 to 5 percent by weight, added. |
| $H_2SO_4$ | 1.5 percent by weight, added. |

*Example C*

| | |
|---|---|
| Silica (sand) | 40 percent by weight. |
| Fire clay (Missouri flint clay) | 48 percent by weight. |
| Refractory fire clay flour (minus 35 mesh) | 12 percent by weight. |
| $H_3PO_4$ (67%) | 3.75 to 5 percent by weight, added. |
| $H_2SO_4$ | 1.5 percent by weight, added. |

Preferably, the amount of clay in the aggregate should not be substantially less than 20% by weight of the total aggregate. The amount of bond-forming agent depends somewhat on the fineness of the aggregate. In Example A above the screen analysis of the clay is approximately

| | Per cent |
|---|---|
| Minus 4 mesh plus 20 mesh | 50 |
| Minus 20 mesh plus 65 mesh | 15 |
| Minus 65 mesh | 35 |

About three times as much acid would be required if the clay were finer, e. g., 80% through 100 mesh.

In mixing the several ingredients, the use of water is minimized since excess or free water reduces concentration, causes migration of acid to the surface, and the water must eventually be removed by drying. For application of the mix as a patching compound, it should preferably be somewhat more plastic than when the material is molded under pressure by the so-called dry press method.

After mixing and molding or placing of the material, heat must be applied to complete the reaction. While temperatures in excess of 212° F. will drive off all free water and develop the strength of the material, its maximum water resistance is not developed until the material is heated substantially above 212° F., e. g., to temperatures of the order of 400° F. Possibly such high temperatures drive off some of the water of combination, thereby developing water resistance. The maximum temperatures may exceed 400° F., but would increase cost.

The use of the phosphoric acid or aluminum phosphate advantageously also gives the material the property of bloating under heat. Generally a linear expansion of 5% to 10% under heat is desired, particularly in the steel industry for ladle brick, etc., to close the cracks between the brick to prevent or minimize penetration of metal and slag. In other uses cracks should be closed or reduced to minimize the erosion which occurs at exposed brick corners. While silica also expands under heat, its expansion is only approximately sufficient to compensate for the shrinkage of the clay in developing a ceramic bond in use.

Obviously the invention is not limited to the details of the illustrative products and their methods of manufacture, since these may be variously modified. Moreover, it is not indispensable that all features be used conjointly, since various features may be used to advantage in different combinations and sub-combinations.

Having described our invention, we claim:

1. A chemically bonded, high strength refractory brick consisting essentially of a refractory aggregate including clay bonded with a minor proportion of not less than 1% acid aluminum sulphate and not less than 3% acid aluminum phosphate.

2. A chemically bonded high strength refractory brick consisting essentially of a refractory aggregate containing not less than 20% by weight of clay bonded with a minor proportion of not less than 1% of acid aluminum sulphate and not less than 3% acid aluminum phosphate.

3. A refractory brick consisting essentially of an aggregate containing not substantially less than 20% by weight of clay and bonded by acid aluminum phosphate and acid aluminum sulphate formed by the reaction between the clay and 2½ to 7% of phosphoric acid and 1 to 4% of sulfuric acid.

4. An unfired refractory brick consisting essentially of an aggregate containing not less than 20% of clay which under X-ray diffraction analysis reveals a substantial exposure of an alumina layer in the cleavage planes of the clay mineral crystals, said aggregate being bonded together with a minor proportion of not less than 1% of acid aluminum sulphate and not less than 3% acid aluminum phosphate.

5. The method of making a refractory brick which comprises mixing inert refractory aggregates with a substance selected from the group consisting of phosphoric acid, phosphoric acid and sulfuric acid, aluminum phosphate and sulfuric acid, phosphoric acid and aluminum sulphate, and then mixing in clay in amount not substantially less than 20% by weight of the total aggregate, dry pressing the mix into shape, and then heating at a temperature substantially in excess of 212° F. to form the acid salts.

6. The method of making a refractory brick which comprises mixing inert refractory aggregate with 2½ to 7% of phosphoric acid and 1 to 5% of sulfuric acid, and then mixing in clay in amount not substantially less than 20% by weight of the total aggregate, dry pressing the mix into shape, and then heating to form the acid salts at a temperature substantially in excess of 212° F. and below the decomposition temperature of acid aluminum sulphate.

7. The method of producing a chemically bonded, high strength refractory brick which comprises heating a pressed shaped refractory aggregate comprising clay, 2½ to 7% of phosphoric acid and 1 to 4% sulphuric acid to a temperature substantially in excess of 212° F. to develop bond of acid aluminum sulphate and acid aluminum phosphate, and maintaining said temperature at below the decomposition temperature of the acid aluminum sulphate.

HOWARD F. WEST.
JOHN H. VEALE.

References Cited in the file of this patent

UNITED STATES PATENTS

| Number | Name | Date |
|---|---|---|
| 1,107,011 | Allen | Aug. 11, 1914 |
| 1,482,793 | Hartmann | Feb. 5, 1924 |
| 1,788,123 | Phelps et al. | Jan. 6, 1931 |
| 1,949,038 | Caven | Feb. 27, 1934 |
| 2,061,099 | Morgan et al. | Nov. 17, 1936 |
| 2,261,400 | Morgan | Nov. 4, 1941 |

FOREIGN PATENTS

| Number | Country | Date |
|---|---|---|
| 159,865 | Great Britain | 1922 |
| 449,751 | Great Britain | 1936 |
| 58,035 | Norway | 1937 |